United States Patent Office 3,725,031
Patented Apr. 3, 1973

3,725,031
HERBICIDAL COMPOSITIONS AND METHODS OF PREPARING THEM
Leslie L. Balassa, Blooming Grove, N.Y., assignor to Balchem Corporation, Slate Hill, N.Y.
No Drawing. Filed Jan. 24, 1969, Ser. No. 793,912
Int. Cl. A01n 5/00
U.S. Cl. 71—105          4 Claims

ABSTRACT OF THE DISCLOSURE

The combination of certain resinous and/or wax-like materials with various agricultural herbicides in an inert, porous carrier reduces the leaching of the herbicide from the upper 10 cm. of soil and losses of herbicide due to volatilization and thus increases the effective field life of the herbicide.

---

This invention relates to an improved herbicide and more particularly to a herbicidal composition capable of maintaining its effectiveness over an extended period of time.

Virtually every crop and ornamental plant is affected by weeds which compete for space, food, and light. The eradication and control of weeds is an economic necessity which can be accomplished by the use of herbicides. A great number of herbicides are known in the art and are now commercially available. As is known in the art, many of these are quite selective and exhibit specific herbicidal activity for certain classes of plants.

A number of factors enter into the performance of any particular herbicide. The chemical structure and nature of the herbicide will determine whether or not the herbicide is effective and the type of plants with which it is effective.

The physical characteristics of herbicides also are important. It is essential that significant quantities of the herbicide be retained in the top 5 to 10 centimeters of soil for maximum effectiveness against weeds. Further, if a substantial amount of the herbicide penetrates beyond the top 10 centimeters of soil, there is danger that the crop plant will be damaged. Accordingly, the volatility and water solubility characteristics of the herbicide can be quite critical. Any loss of herbicide from the upper layer of soil, whether by volatilization or by dissolution and soil penetration, gives a corresponding loss in the ability of the herbicide to control weed growth. Such losses necessitate reapplication of the herbicide during the growing season at considerable cost.

As a general rule, herbicides are diluted with either a liquid or a solid diluent or adsorbed on a porous carrier. In particular, selective herbicides which are applied to the soil are often adsorbed on a coarse granular carrier which facilitates their application. The characteristics of the carrier can significantly influence the stability of the herbicide and its release to the soil. Granular attapulgite type clays are the most commonly used carriers for soil application; however, other materials e.g. expanded vermiculite or corncob grits, have also been successfully employed as carriers of herbicides. The hydrophylic attapulgites with polar acidic surfaces have particular affinity for many of the herbicides having polar chemical structures.

Herbicides applied to the surface of the soil are exposed to leaching by rain water and volatilization by air currents and the heat of the sun. When applied to subsurface, the herbicides are in direct contact with the soil and are therefore affected by the chemistry and the microbiological life of the soil. Dicamba (2-methoxy-3,6-dichloro benzoic acid) has a relatively low solubility in water. The salts of Dicamba, however, show considerable water solubility. In contact with the soil, especially with high pH soil, Dicamba forms water soluble salts which are rapidly dissipated by rain water, irrigation water or even by soil moisture, and dissolved Dicamba is carried to lower soil depths where its herbicidal effect is largely lost.

Other herbicides such as Casoron or Dichlobenil (2,6-dichlorobenzonitrile), while only slightly soluble in water, are too volatile to remain with the carrier in the soil long enough to suppress weed growth throughout the growing period.

The choice of carrier while important with regard to adsorbency was found to have only minimal effect on the rate of solubility and volatility and on the consequent loss of the herbicide by dissipation to the soil or to the atmosphere. The size and the weight of the carrier granules is however important in controlling the application properties of the herbicides.

It has now been found that the herbicides can be combined with certain resinous and/or wax like materials and incorporated in a porous carrier to provide herbicidal compositions of controlled water solubility and volatility. The preferred materials are those with which the herbicides are compatible to form a solid solution providing a continuous water insoluble film, and those which form a wax type film which holds the herbicides in a micellar structure.

Herbicides which can be employed in the composition in the present invention are shown in Table I.

TABLE I

| Chemical name | Formula | Trade name |
|---|---|---|
| 2-methoxy-3 6-dichlorobenzoic acid | COOH, Cl, OCH$_3$, Cl (benzene ring) | Dicamba. |
| 2,6-dichlorobenzonitrile | Cl, C≡N, Cl (benzene ring) | Casoron Dichlobenil. |
| 4,6-dinitro-o-sec-butylphenol | NO$_2$, OH, CH$_3$, CH, C$_2$H$_5$, NO$_2$ (benzene ring) | DNBP. |

TABLE I—Continued

| Chemical name | Formula | Trade name |
|---|---|---|
| 2-chloro-4-ethylamino-6-isopropylamino-1,3,5-triazine | (2-chloro-4-ethylamino-6-isopropylamino-1,3,5-triazine structure) | Atrazine. |
| 2,3-dichloroallyl N,N-diisopropylthiolcarbamate | $ClCH=CCl-CH_2-S-C(=O)-N(CH(CH_3)_2)_2$ | Avadex. |
| Polychlorodicyclopentadiene isomers (chlorine content 60–62%) | | Bandane. |
| 4-chloro-2-butynyl N-(3-chlorophenyl)carbamate | (3-chlorophenyl)-NH-C(=O)-O-CH$_2$-C≡C-CH$_2$Cl | Barban. |
| Isopropyl N-(3-chlorophenyl)carbamate | (3-chlorophenyl)-NH-C(=O)-O-CH(CH$_3$)$_2$ | CIPC. |
| 4,6-dinitro-o-cresol sodium salt | 2,4-(O$_2$N)$_2$-6-CH$_3$-C$_6$H$_2$-ONa | DNC. |
| Dimethyl 2,3,5,6-tetrachloroterephthalate | tetrachloroterephthalate dimethyl ester | Dacthal. |
| 1,3-bis(2,2,2-trichloro-1-hydroxyethyl)urea | (CCl$_3$-CH(OH)-NH-)$_2$C=O | Dichloral urea. |
| N-(3,4-dichlorophenyl)methacrylamide | CH$_2$=C(CH$_3$)-C(=O)-NH-(3,4-dichlorophenyl) | Dicryl. |
| 2,5-dichloro-3-nitrobenzoic acid | 2,5-Cl$_2$-3-NO$_2$-C$_6$H$_2$-COOH | Dinoben. |
| N,N-dimethyl-2,2-diphenylacetamide | (C$_6$H$_5$)$_2$CH-C(=O)-N(CH$_3$)$_2$ | Diphenamide. |

TABLE I—Continued

| Chemical name | Formula | Trade name |
|---|---|---|
| Diphenylacetonitrile | (C$_6$H$_5$)$_2$CH—C≡N | Diphenatrile. |
| N,N-di(n-propyl)-2,6-dinitro-4-methylaniline | 4-CH$_3$-2,6-(O$_2$N)$_2$-C$_6$H$_2$-N(C$_3$H$_7$)$_2$ | Dipropalin. |
| Disodium methylarsonate | CH$_3$As(=O)(ONa)$_2$ | Disodium methylarsonate. |
| 1,1'-ethylene-2,2'-dipyridylium dibromide | [bipyridylium-CH$_2$CH$_2$]Br$_2$·H$_2$O | Diquat. |
| N-(2-(O,O'-diisopropylthiophosphoryl)ethyl)-benzenesulfonamide | ((CH$_3$)$_2$CH—O)$_2$P(S)—CH$_2$—CH$_2$—NH—S(O)$_2$—C$_6$H$_5$ | Disan. |
| 3-(3,4-dichlorophenyl)-1,1-dimethylurea | 3,4-Cl$_2$-C$_6$H$_3$-NH-C(O)-N(CH$_3$)$_2$ | Diuron. |
| Disodium 3,6-endoxohexahydrophthalate | (endoxohexahydrophthalate)(ONa)$_2$ | Endothal. |
| Ethyl N,N-di-n-propylthiolcarbamate | CH$_3$CH$_2$S—C(O)—N(C$_3$H$_7$)$_2$ | Eptam. |
| 2,(2,4,5-trichlorophenoxy)ethyl 2,2-dichloropropionate | 2,4,5-Cl$_3$-C$_6$H$_2$-O-C$_2$H$_4$-O-C(O)-C(Cl)$_2$-CH$_3$ | Erbon. |
| Bis(ethylxanthic)disulfide | C$_2$H$_5$O-C(S)-S-S-C(S)-OC$_2$H$_5$ | Ethyl xanthogen disulfide. |
| Tris(2,4-dichlorophenoxyethyl)phosphite | [2,4-Cl$_2$-C$_6$H$_3$-O-CH$_2$CH$_2$O]$_3$P | Falones |

TABLE I—Continued

| Chemical name | Formula | Trade name |
|---|---|---|
| 2,3,4,5,6-pentachlorophenol | (pentachlorophenol structure) | PCP. |
| 2-chloro-4,6-bis(isopropylamino)-1,3,5-triazine | (propazine structure) | Propazine. |
| 2-chloro-4,6-bis(ethylamino)-1,3,5-triazine | (simazine structure) | Simazine. |
| Methyl N-(3,4-dichlorophenyl)-carbamate | (swep structure) | Swep. |
| 2,4-dichlorophenoxyacetic acid | (2,4-D structure) | 2,4-D. |
| N-(1-naphthyl)-phthalamic acid | (alanap structure) | Alanap. |
| 3-amino-2,5-dichlorobenzoic acid | (amiben structure) | Amiben. |

The resinous and/or waxy materials useful for the purposes of the present invention may be described as members of the group of waxes, resins, bitumens, tars and pitches. Typical waxes include carnauba, beeswax, candelilla and other vegetable and insect waxes, hydrogenated fatty-acid glycerides, hydrogenated castor oil, ozokerite (Hoechst Wax S) and oxidized ozokerite waxes (X-22 of Hoechst Chemical Co.) and their modifications, paraffin waxes, oxidized paraffin waxes, and microcrystalline waxes (Multi-wax W-445, Witco Chemical Co.). Typical resins include wood and gum rosin, rosin esters, e.g., pentaerythritol ester of rosin (Pentalyn 255 of Hercules Chemical Co.), terpene resins (Piccolite A-115 of Pennsylvania Industrial Chem. Corp.), gum damar, gum copal alkyd resins, oil modified alkyds, polystyrene (Dow resin PS-2), polyacrylates and polymethacrylates, cellulose esters and ethers (ethyl cellulose, 7 cps. grade, Hercules Chemical Co.) polyvinyl esters and ethers and shellac. Typical bitumens include gilsonite, petroleum asphalt (Pioneer 180 and Pioneer 220 of Witco Chemical Co.), oxidized asphalt (180/200 melting point, Humble Oil and Refining Co.). Typical tars and pitches include coaltar and coaltar pitches, wood creosote, wood pitch, and bone pitch.

Useful inert carriers for the composition of the present invention include expanded vermiculite, sintered clay granules, attapulgite clay, corncob grits, and coke granules. Other similar porous carriers are known in the art.

One particularly superior carrier material is commercially available under the name "True-sorb." This material comprises calcined clay-sericite granules, commonly of −24+48 mesh (Tyler) grain size, and has a typical chemical analysis as follows:

|   | Percent |
|---|---|
| Silica (SiO) | 85.40 |
| Aluminum oxide (AlO) | 4.48 |
| Iron oxide (FeO) | 0.88 |
| Calcium oxide (CaO) | 0.20 |
| Magnesium oxide (MgO) | 0.54 |
| Sodium and potassium oxide (RO) | 0.15 |
| Loss on ignition (largely combined water) | 8.35 |
|   | 100.00 |

Spectrographic analysis confirmed the chemical analysis and additionally indicated a small titanium content and traces of lithium, copper, chromium and manganese. The material exhibits a pH of 7-7-2, has a density of 38 lbs./ft.$^3$ and a lube oil absorbency of 79%.

A suitable method for the preparation of the herbicides composition of the present invention comprises dissolving the herbicide and the selected protective material in a volatile solvent in which both are soluble and effecting homogenous solution of the materials. If necessary, heat may be applied to assist in forming the homogenous solution. The solution is then absorbed onto a suitable porous carrier of the type described and the volatile solvent is evaporated. This leaves the herbicide in combination with the protective material in intimate contact with the carrier. The release properties, the solubility and the volatility of the herbicides, are then controlled by the combined factors of the nature of the protective material, the ratio of herbicide to protective material and the nature of the carrier relative to the materials absorbed thereon.

Additional factors which influence the effective field-life of a herbicide are its oxidative character and its resistance to microbiological degradation. The herbicides of the present invention may be protected from microbiological or oxidative degradation through the inclusion of bactericides, fungicides and antioxidants in the basic composition. Typical antioxidants for this purpose are hydroxyanisole.

Examples of agents useful for minimizing microbiological attack are as follows:

Copper compounds.—Copper salts of long chain fatty acids, including copper oleate, copper stearate and copper octoate; copper naphthenate; and copper 8-hydroxyquinolinolate.

Phenol compounds.—Phenol and the oil or hydrocarbon solvent soluble phenols and derivatives; halophenols, particularly o-benzyl-p-chlorophenol (Santophen I made by the Monsanto Chemical Company); o-phenylphenol; chloro - ortho - phenylphenol; pentachlorophenol; tetrachlorophenol; chloroxylenol; chlorocresol; chlorobenzylphenol; methylene-bis (tri-chlorophenol); and the salts of the foregoing which are soluble in the herbicides; alkyl phenols having an alkyl group of 2–28 carbon atoms in the molecule including the various cresols, o-, and p-ethylphenol, p-isopropyl phenol, p-tertiary-butyl phenol, 2-methyl-4-dodecyl phenol, o-hexadecyl phenol.

Organo-mercury compounds.—Phenyl-mercury acetate.

The foregoing compounds are introduced into the composition of the present invention by dissolving them or dispersing them in the herbicides, in the protective matrix, or in both, in an amount of from about 0.01% to about 10% (by weight, based on solvent-free herbicidal composition). They may also be employed by dusting spraying or coating the surface of the granular composition. The preferred method, however, is to include the additive in the matrix or in the herbicide for maximum effectiveness.

Coal tar, pitch and wood creosote contain sufficient of the above phenolic compounds to provide the desired bacteriostatic and fungistatic properties to be suitable as part or all of the protective material for the herbicides. Coal tar pitch additionally possesses sufficient moisture resistance to serve as a protective agent against both hydrolysis and microbiological degradation. Accordingly, coal tar pitch is one of the preferred agents for incorporation in the composition of the present invention.

The combinations of any of the aforementioned herbicides with any of the aforementioned protective materials and carriers are effective for the purposes of the present invention. In the example which follows, 100 grams of herbicide and 100 grams of protective material were individually dissolved in solvent to form 50% solutions. The solutions were heated slightly to insure complete dissolution of the solutes and were blended while still hot. The resulting combined solution was absorbed on 800 grams of porous granular carrier which had been preheated to about 50° C. The solvent was evaporated at a temperature below 50° C. with constant mixing of the granular mass to provide approximately 1,000 grams dry weight of the herbicidal composition. The following materials were employed.

TABLE II

| Example | Herbicide | Protectant | Solvent | Carrier |
|---|---|---|---|---|
| I | Dicamba | Piccolite A-115 | Carbon tetrachloride | Expanded vermiculite. |
| II | do | Piccolite A-115 | Toulene | Attapulgus clay. |
| III | do | Wood resin | do | Do. |
| IV | do | Pentalyn 255 | do | Do. |
| V | do | Pioneer 220 | do | Do. |
| VI | do | Oxidized asphalt | do | Do. |
| VII | Dichlobenil | do | do | Do. |
| VIII | do | X-22 | do | Do. |
| Control A | | | | Do. |
| Control B | Dicamba | | Toluene | Do. |
| Control C | Dichlobenil | | do | Do. |

Appropriate solvents for Dicamba (2-methoxy-3,6 dechlorobenzoic acid) and Dichlobenil (2,6-dichlorobenzonitrile) include benzene, toluene, and carbon tetrachloride.

Topsoil was packed into eight polyethylene columns (5 cm. in diameter x 25 cm. deep). A one gram sample from one of Examples I through VI and Controls A and B was placed in each of the columns and thoroughly mixed into the top one centimeter of soil. The eight columns were held in a vertical position and were sprayed with distilled water for 15 minutes every 12 hours. Each such spraying corresponds to a rainfall of 0.5 cm. over the column surface. This procedure continued for 21 days during which period the columns were maintained at 25° C. and 80% humidity. At the end of the 21 day test period, the columns were cut into 10 separate sections (of 2.5 cm. each) with minimum disturbance of soil material. In each soil section, 10 soybeans were planted, with each being completely covered by the soil material. The seeded soil sections were then placed in an incubator at 25° C. and 98% humidity. After 14 days the soybeans were removed from the soil sections and examined to determine the effect of the herbicide. The results of these tests are set forth in Table III. The column "Soil Section" sets forth the distance from the top of the soil column in centimeters at which the section was taken. The numerical results reported in the table represented the number of soybeans showing herbicidal injury, a value of 0 indicating no damage to soybeans in that particular soil section and a value of 10 indicating injury to all of the soybeans in that particular soil section.

TABLE III

| Soil section depth in cm. | Injury to soybean | | | | | | | |
|---|---|---|---|---|---|---|---|---|
| | Control A | Control B | Ex. I | Ex. II | Ex. III | Ex. IV | Ex. V | Ex. VI |
| 0–2.5 | 0 | 3 | 9 | 8 | 8 | 9 | 8 | 9 |
| 2.5–5 | 0 | 3 | 9 | 9 | 8 | 8 | 9 | 9 |
| 5–7.5 | 1 | 4 | 10 | 8 | 9 | 9 | 9 | 7 |
| 7.5–10 | 0 | 3 | 4 | 8 | 7 | 6 | 4 | 8 |
| 10–12.5 | 0 | 6 | 1 | 3 | 6 | 4 | 0 | 2 |
| 12.5–15 | 0 | 7 | 0 | 2 | 1 | 1 | 0 | 0 |
| 15–17.5 | 0 | 5 | 0 | 1 | 0 | 0 | 0 | 0 |
| 17.5–20 | 0 | 8 | 0 | 0 | 0 | 0 | 1 | 0 |
| 20–22.5 | 0 | 7 | 0 | 0 | 0 | 1 | 0 | 0 |
| 22.5–25 | 0 | 7 | 0 | 0 | 0 | 0 | 0 | 0 |

As is evident from the data of Table III, the herbicide control without protectant caused plant injury throughout the 25 cm. soil column, with the greatest plant injury occurring at depths below 12.5 cm. The herbicide compositions of Examples I through VI caused little or no injury at depths at excess of 12.5 cm. and by far the greatest injury occurred in soil samples of less than 10 cm. depth. Thus, the compositions of the present invention retained a high degree of herbicidal activity in the upper 10 cm. of soil where such actiivty is most important without significant injury at depths below 12.5 cm.

Dichlobenil is characteristic of the herbicides exhibiting excessive volatility, albeit, it is comparatively resistant to dissolving. To illustrate the improvement of the present invention with Dichlobenil, two gram samples of the materials of each of Examples VII and VIII, and of Control C were maintained at 50° C. under identical conditions. Every 24 hours the samples were weighed and the loss in weight determined. The results of these tests are set forth in Table IV.

TABLE IV

| Elapsed time, days | Cumulative herbicide loss, percent of original | | |
|---|---|---|---|
| | Control C | Ex. VII | Ex. VIII |
| 1 | 50 | 25 | 35 |
| 2 | 85 | 30 | 50 |
| 3 | 100 | 36 | 75 |
| 7 | | 70 | 100 |

As is evident from the data of Table IV, the composition of the present invention has a very significantly increased life as compared to the controlled example.

While the method described previously for the preparing of the herbicidal composition of the present invention is the preferred method, other effective techniques are available. Thus, satisfactory results may be obtained by applying either the herbicide or the protective material to the porous material individually from solution coupled with evaporation of the solvent and then applying the other component solution and evaporating the second solvent. Following this technique, it is unnecessary and in some instances may be undesirable for the solvent used to dissolve the herbicide to be the same as the solvent used to dissolve the protective material. Under such circumstances, the solvent may be selected for the herbicide without regard to its solvency action on the protective material, and vice versa. Thus Dicamba has been applied to attapulgite granules from an ethanol solution, the ethanol was removed by evaporation, and a solution of petroleum asphalt (Pioneer 180 Witco Chemical Co., 180° F. melting point) in hexane was applied and the hexane removed by evaporation. The granular product was subjected to the leaching test described with regard to the test of Table II and gave results essentially the same as those for the material of Example V.

While various support material have been disclosed previously for the composition of the present invention, a modified support material has been found to provide exceptional results. Attapulgite granules, pre-coated with shellac, provide a carrier showing increased resistance to dissipation of herbicidal composition contained therein. In a typical example of the preparation of such porous carrier, a 2% solution of shellac in ethanol was employed to impregnate the attapulgite granules. After drying, the shellac-coated granules were coated with a toluene solution of Dicamba and wood rosin. In a leaching test of the type described herein with respect to Table II, the composition applied to the precoated attapulgite showed very considerably less dissipation than the same combination applied directly to uncoated attapulgite. This technique is particularly valuable with herbicides that tend to be readily decomposed by the catalytic action of clay granules. A thin precoating of oxidized asphalt similarly protects the herbicide and reduces dissipation of the herbicide from the composition. These shellac-precoated, and oxidized asphalt-precoated clay granules have also been found to provide an excellent carrier for insecticides and fungicides and particularly for the phosphorothioate and insecticides such as 2 - methyl - 2-(methylthio) propionaldehyde O-(methylcarbamoyl) oxime. In general, the amount of said precoating should be from about 0.2% to 20% by weight of the carrier.

There is no critical limit on the amount of herbicide employed in the compositions of the present invention other than the convenience of the user in order to obtain a satisfactory and effective dosage. In general, the herbicide can comprise from about 0.5% to 50% by weight of the carrier, but preferably is from about 1.0% to about 10.0% by weight of the total composition. The amount of protective material employed will vary depending on the nature of the selected herbicide and the degree of herbicide dissipation which can be tolerated and can range from about 2% to about 80% by weight of the carrier. In general, however, the amount will range from 1.0% to about 30% by weight of the total composition at a protectant-to-herbicide ratio of 1:1 to 10:1. The protectant must be water insoluble but soluble in a readily volatilized solvent. All of the useful protectant should, of course, be essentially nonreactive with the herbicides, at least to the extent that it does not exhibit a deleterious affect on the herbicidal activity. Similarly, the carrier for the composition should be essentially inert with regard to the herbicide.

What I claim is:

1. A process for preparing a herbicidal composition which comprises:
   (A) dissolving an organic herbicide selected from the group consisting of 2-methoxy-3,6-dichlorobenzoic acid and 2,6-dichlorobenzonitrile and a water-insoluble, normally solid, fusible, non-reactive protectant material in a volatile solvent selected from the group consisting of benzene, toluene and carbon tetrachloride in which both said herbicide and said protectant material are soluble, said protectant material being selected from the group consisting of carnauba wax, oxidized petroleum asphalt, terpene resin and ozokerite wax,
   (B) absorbing the resultant solution on an inert, porous, granular carrier material comprising attapulgite granules which have been coated with a member selected from the group consisting of shellac and oxidized asphalt,
   (C) evaporating said solvent therefrom to provide a herbicidal composition wherein the herbicide, protectant and carrier material are in intimate association with each other, said composition containing from about 0.5% to about 50% of herbicide by weight of said carrier and from about 2% to about 80% of protectant by weight of said carrier.

2. A method for the preparation of a herbicidal composition comprising the steps of precoating attapulgite granules with shellac; impregnating the resulting granules with a toluene solution of 2-methoxy-3,6-dichlorobenzoic acid; volatilizing therefrom said toluene; impregnating the granules with a hexane solution of water-insoluble, normally solid, fusible, non-reactive terpene resin; and volatilizing therefrom said hexane.

3. A herbicidal composition comprising:
   (A) an inert, porous, granular carrier material comprising attapulgite granules having a precoating of a member selected from the group consisting of shellac and oxidized asphalt,
   (B) a protective coating of a water-insoluble, normally solid, fusible, non-reactive protectant material selected from the group consisting of carnauba wax, oxidized petroleum asphalt, terpene resin and ozokerite wax said protectant material containing an organic herbicide selected from the group consisting of 2-methoxy-3,6-dichlorobenzoic acid and 2,6-dichlorobenzonitrile, homogeneously dispersed therethrough, (1) said herbicide being present in an amount of from about 0.5% to about 50% by weight of said carrier; and
(2) said protectant material being present in an amount from about 2% to about 80% by weight of said carrier.

4. A herbicidal composition in accordance with claim 3, comprising shellac-precoated attapulgite granules, 2-methoxy-3,6-dichlorobenzoic acid, and a water-insoluble, normally solid, fusible, non-reactive terpene resin.

References Cited

UNITED STATES PATENTS

| | | | |
|---|---|---|---|
| 3,328,256 | 6/1967 | Gaunt | 424—19 |
| 3,344,029 | 9/1967 | Berger | 424—19 |
| 1,946,462 | 2/1934 | Hyde et al. | 71—79 |
| 2,821,500 | 1/1958 | Jackson et al. | 424—34 |
| 3,074,845 | 1/1963 | Geary | 71—79 |
| 3,083,089 | 3/1963 | Renner | 71—88 |
| 3,143,460 | 8/1964 | Pearce | 117—100 |
| 3,154,402 | 10/1964 | Salvesen | 71—100 |
| 3,172,752 | 3/1965 | Pierce | 71—62 |
| 3,197,462 | 7/1965 | Roberts et al. | 71—79 |
| 3,207,594 | 9/1965 | Wagner | 71—115 |
| 3,212,967 | 10/1965 | McFadden et al. | 424—78 |
| 3,227,657 | 1/1966 | Haden Jr. et al. | 424—357 |
| 3,274,052 | 9/1966 | Yaffe et al. | 424—278 |
| 3,366,539 | 1/1968 | Woodbury | 424—218 |

FOREIGN PATENTS

| | | | |
|---|---|---|---|
| 898,915 | 6/1962 | Great Britain | 71—92 |

OTHER REFERENCES

Weeds, "Common and Chemical Names of Herbicides" (1967), vol. 15, No. 4 (October 1967).

LEWIS GOTTS, Primary Examiner

G. HOLLRAH, Assistant Examiner

U.S. Cl. X.R.

71—65, 79, 115, Dig. 1; 424—357, 362, 363, 364, 365